Feb. 7, 1928.
C. WOOD
1,658,754
MEDICAL IRRIGATION APPARATUS
Filed Aug. 20, 1924
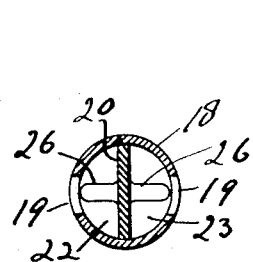
Fig 3
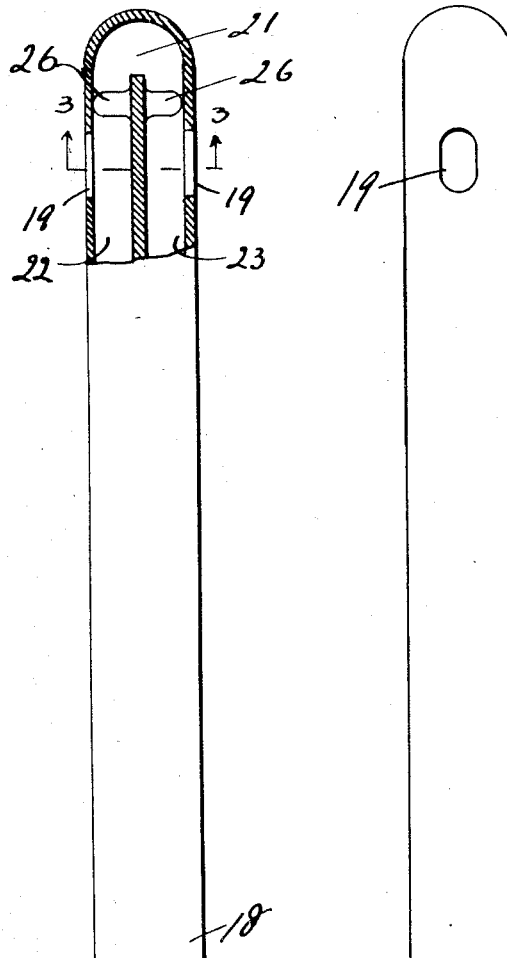
Fig. 1.
Fig. 2
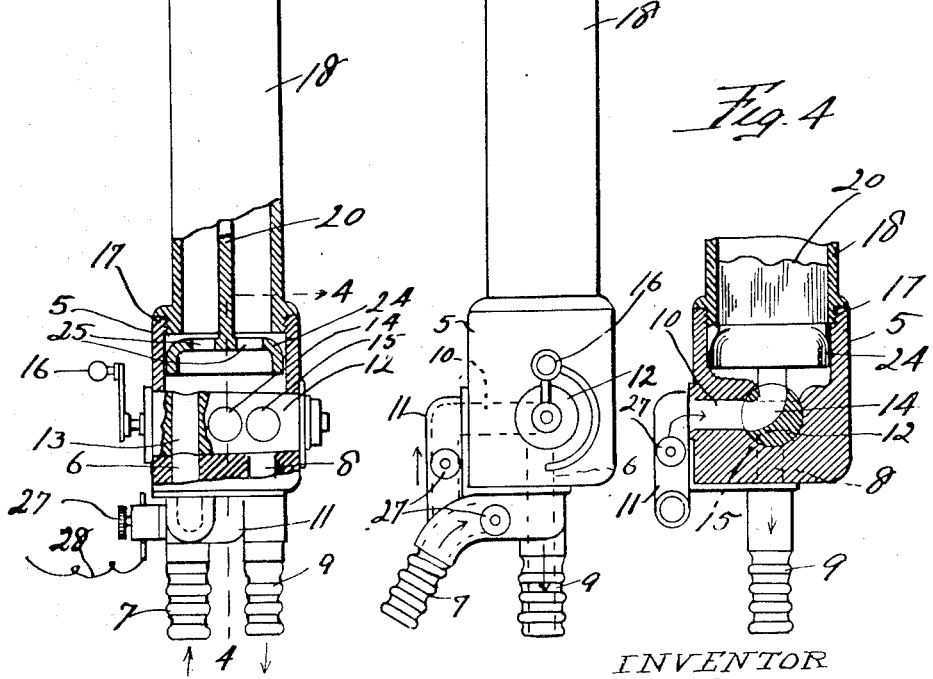
Fig. 4
INVENTOR
Centa Wood
BY W. W. Williamson Atty.

Patented Feb. 7, 1928.

1,658,754

UNITED STATES PATENT OFFICE.

CENTA WOOD, OF ATLANTIC CITY, NEW JERSEY.

MEDICAL IRRIGATION APPARATUS.

Application filed August 20, 1924. Serial No. 733,074.

My invention relates to new and useful improvements in a medical irrigation apparatus, and has for its primary object the construction of an exceedingly simple and effective device of this character for the irrigation of the bladder, rectum or other organs of the human body.

Another object of the invention is to provide an irrigation apparatus having means for controlling the flow of the irrigation fluid so that at one time said fluid will flow inward only, and at still another time to flow in and out or circulate.

A further object of the invention is to provide for dividing the interior of the tube into two compartments, which means is removable when the device is to be used with the fluid flowing in only one direction.

A still further object of the invention is to provide means for treating the organs with electricity through the stream of fluid passing through the apparatus.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which :—

Fig. 1, is a sectional elevation of a medical irrigation apparatus constructed in accordance with my invention.

Fig. 2, is a side elevation thereof at right angles to the showing in Fig. 1.

Fig. 3, is a section at the line 3—3 of Fig. 1.

Fig. 4, is a section at the line 4—4 of Fig. 1.

In carrying out my invention as here embodied, 5 represents the body of the apparatus having an inlet canal 6 therein leading from the outer end and communicating with the connector 7 to which may be connected a suitable tube running from a source of supply such as a water bag and parallel with the inlet canal 6 is formed an outlet canal 8 communicating with the connector 9 to which may be attached one end of a suitable tube leading to a waste receptacle such as a pan. In this body is also formed another or supplementary inlet canal 10 communicating with the conduit 11 and also with the inlet connector 7 and said canal 10 runs from one side of the body and is located at a point midway between the two canals 6 and 8.

All of these canals are controlled by a rotatable valve 12 having passageways 13, 14 and 15 therethrough adapted to register with the various canals as will be hereinafter more fully explained. The valve is provided with a suitable operating handle whereby it may be rotated when desired.

At the inner end of the body 5 is formed a threaded socket 17 adapted to receive the tube 18 exteriorly threaded at its inner end for insertion in the socket to connect said tube with the body as will be obvious. This tube is open at its inner end and closed at its outer end but has apertures 19 formed adjacent its outer end for the passage of the irrigating fluid.

An insertable tongue or partition 20 is removably mounted within the tube 18 and is slightly shorter than said tube so as to provide a communicating passageway 21 at the extreme outer end of the tube and two chambers 22 and 23, one on each side of the tongue or partition, in communication with each other through the communicating passageway 21. The tongue or partition 20 is provided with a base 24 to fit within the body 5 of the apparatus and said base is provided with openings 25 to form communications between the interior of the body and the two compartments formed by the tongue while at the outer end said tongue is provided with suitable lugs 26 to engage the inner surfaces of the tube walls for centering said outer end of the tongue.

On both the inlet connector 7 and the conduit 11 are mounted suitable binding posts 27 by which suitable electric conductors 28 may be connected with either the conduit 11 or inlet connector 7, said conductor 28 leading from a suitable source of electric energy, it being understood that the binding posts 27 project into the interior of the parts to which they are connected so as to contact with the fluid flowing through such parts.

When the tongue or partition 20 is removed and the apparatus is used for one of the purposes for which it is designed the valve 12 may be turned to the position shown in Fig. 1 at which time the fluid from the source of supply will flow through the canal 6 and passageway 13, thence through the tube 18 and out of the apertures 19 to the part of the body being treated. After the fluid has remained the desired length of time the valve 12 is then rotated until the passageway 15 registers with the canal 8 which will permit the fluid to pass through the apertures 19 into the tube 18 and then through the passageway 15 and canal 8 into the waste receptacle.

When it is desired to treat a part of the body by circulation of the fluid through the part of the body being treated the tongue or partition 20 is inserted in the position shown in Fig. 1 then by turning the valve 20 to the position shown in Fig. 4 the supplementary inlet canal 10 as well as the outlet canal 8 will be open and therefore the fluid may pass through the connector 7, conduit 11, canal 10, passageway 14 and one of the openings 25 into the chamber 22. From the chamber 22 some of the fluid will pass out through the aperture 19 in communication with said chamber 22 while another portion will follow around the partition through the communicating passageway 21 into the chamber 23 and at the same time the returning fluid from the organ being treated will pass into the chamber 23 through the aperture 19 in communication with said chamber. All of the return fluid will then pass from the chamber 23 through the opening 25, passageway 15 in the valve, outlet canal 8 and its connector 9 to the waste receptacle.

At the same time that an irrigation is being given to a patient an internal electric treatment may also be given by connecting the conductor 28 leading from a source of electrical energy with the proper binding post 27 and placing a suitable conductor against the body of the patient thus causing the electric current to pass through the body of water and then through the body of the patient.

Of course I do not wish to be limited to the exact details of construction as herein shown as these may be varied within the limits of the appended claims without departing from the spirit of my invention.

Having thus fully described my invention, what I claim as new and useful is:—

1. The combination with a medicinal irrigation apparatus including a body having canals therein for the inlet and outlet of a fluid, means to control said canals, and a tube connected with said body and having apertures adjacent its outer end, of a partition element insertible in the tube and having means adjacent its distal end coacting with the walls of the tube beyond the apertures to center said partition element without obstructing the passageways to said apertures.

2. The combination with a medicinal irrigation apparatus including a body provided with valve controlled inlets and outlets, and an apertured tube connected with the body, of a partition temporarily insertible in the tube from the inner end of the latter, and a pair of lugs projecting from opposite sides of the partition, adjacent its distal end, said lugs being in endwise alignment and coacting with the inner surface of the walls of the tube to maintain the partition in the longitudinal center of said tube.

In testimony whereof, I have hereunto affixed my signature.

CENTA WOOD.